(12) United States Patent
Hoffmann

(10) Patent No.: US 9,381,832 B2
(45) Date of Patent: Jul. 5, 2016

(54) FITTING FOR AN ADJUSTMENT DEVICE OF A MOTOR VEHICLE SEAT

(75) Inventor: Andreas Hoffmann, Wülfrath (DE)

(73) Assignee: Johnson Controls Metals and Mechanisms GmbH & Co. KG, Solingen (DE)

( * ) Notice: Subject to any disclaimer, the term of this patent is extended or adjusted under 35 U.S.C. 154(b) by 132 days.

(21) Appl. No.: 14/233,529

(22) PCT Filed: Jul. 5, 2012

(86) PCT No.: PCT/EP2012/063151
§ 371 (c)(1),
(2), (4) Date: Jan. 17, 2014

(87) PCT Pub. No.: WO2013/010808
PCT Pub. Date: Jan. 24, 2013

(65) Prior Publication Data
US 2014/0183919 A1    Jul. 3, 2014

(30) Foreign Application Priority Data
Jul. 21, 2011    (DE) .......................... 10 2011 052 044

(51) Int. Cl.
*B60N 2/225*    (2006.01)
*F16H 57/00*    (2012.01)
*F16H 1/32*    (2006.01)

(52) U.S. Cl.
CPC .......... *B60N 2/2251* (2013.01); *F16H 57/0006* (2013.01); *B60N 2205/20* (2013.01); *F16H 2001/323* (2013.01)

(58) Field of Classification Search
CPC .................................................... B60N 2/2251
USPC ........................................................... 297/362
See application file for complete search history.

(56) References Cited

U.S. PATENT DOCUMENTS

| 4,211,451 | A |   | 7/1980 | Shephard |
| 5,098,359 | A |   | 3/1992 | Chales et al. |
| 5,368,363 | A | * | 11/1994 | Sakamoto ............ B60N 2/2251 297/362 |
| 6,715,832 | B2 | * | 4/2004 | Dill .............................. 297/313 |
| 7,100,987 | B2 | * | 9/2006 | Volker et al. ............... 297/367 R |

(Continued)

FOREIGN PATENT DOCUMENTS

| CN | 105 9122 A | 3/1992 |
| CN | 195 1719 A | 4/2007 |

(Continued)

*Primary Examiner* — David R Dunn
*Assistant Examiner* — Jody Giacoman
(74) *Attorney, Agent, or Firm* — McGlew and Tuttle, P.C.

(57) ABSTRACT

A fitting (1) for an adjustment device, in particular inclination adjustment of a motor vehicle seat, includes a fitting upper part (2) having a first internal toothing (4), a fitting lower part (3) which is adjustable relative to the fitting upper part about a fitting axis and has a second internal toothing (5) arranged coaxially with respect to the first internal toothing, at least two, preferably, three, rotatably arranged planet gears (7) which are in engagement with the first and second internal toothings, and a drive shaft (6) which is in operative connection with the at least two planet gears by means of a pinion (23). Noise loads and buckling effects are avoided even after a relatively long period of operation, with a spring element (11) prestressing the planet gears (7) in the direction of the axis of rotation onto the fitting lower part (3) or fitting upper part (2).

8 Claims, 5 Drawing Sheets

(56) References Cited

U.S. PATENT DOCUMENTS

| | | | |
|---|---|---|---|
| 7,140,686 B2* | 11/2006 | Rohee | 297/366 |
| 7,520,568 B2* | 4/2009 | Hoshihara et al. | 297/367 R |
| 8,845,202 B2* | 9/2014 | Teimel | 384/517 |
| 2003/0080599 A1* | 5/2003 | Hohn et al. | 297/362 |
| 2004/0251727 A1 | 12/2004 | Beneker et al. | |
| 2011/0169313 A1* | 7/2011 | Schulz et al. | 297/362 |

FOREIGN PATENT DOCUMENTS

| | | |
|---|---|---|
| DE | 19 546 433 C1 | 5/1997 |
| DE | 101 06 422 A1 | 8/2002 |
| DE | 102 19 199 A1 | 11/2003 |
| DE | 10 2005 015831 B3 | 9/2006 |
| DE | 103 27 090 B4 | 3/2007 |
| DE | 10 2006 036 732 B4 | 5/2008 |
| DE | 10 2008 039942 A1 | 3/2010 |
| JP | S61-9052 U | 1/1986 |
| JP | H03-118006 A | 5/1991 |
| JP | 2004-237019 A | 8/2004 |
| JP | 2005-161034 A | 6/2005 |
| JP | 2006-034729 A | 2/2006 |
| KR | 10-2010-0111350 A | 10/2010 |
| WO | 02/064397 A1 | 8/2002 |

\* cited by examiner

FITTING FOR AN ADJUSTMENT DEVICE OF A MOTOR VEHICLE SEAT

CROSS REFERENCE TO RELATED APPLICATIONS

This application is a U.S. National Phase Application of International Application PCT/EP2012/063151 filed Jul. 5, 2012 and claims the benefit of priority under 35 U.S.C. §119 of German Patent Application DE 10 2011 052 044.9 filed Jul. 21, 2011, the entire contents of which are incorporated herein by reference.

FIELD OF THE INVENTION

The invention relates to a fitting for an adjustment device, in particular for an inclination adjustment of a motor vehicle seat, with a fitting upper part having a first internal toothing, a fitting lower part which is adjustable relative to the fitting upper part about a fitting axis and has a second internal toothing arranged coaxially with respect to the first internal toothing, at least two, preferably, three, rotatably arranged planet gears which are in engagement with the first and second internal toothings, and a drive shaft which is in operative connection with the at least two planet gears by means of a pinion.

BACKGROUND OF THE INVENTION

Fittings of the aforementioned type are used in the field of motor vehicles, especially for adjustment devices of a motor vehicle seat, for example to adjust a backrest relative to a seat surface, or an inclination or a height of the motor vehicle seat, wherein the movement that arises from swinging the fitting upper part relative to the fitting lower part is used to displace the components of the motor vehicle seats that can be arranged on the fitting parts.

To realize a displacement of the fitting upper part relative to the fitting lower part, the first and second internal toothing have a different number of teeth, yet at the same time concentric crown and root circles. Driving the planet gears by means of a pinion that can be engaged directly with the planet gears, or that also serves to drive a sun wheel in contact with the planet gears, causes a rotation of the fitting upper part relative to the fitting lower part, wherein the fitting design provides the ability for very precise adjustment while self-inhibiting the adjusted position.

In order to ensure that the fitting functions even when the tolerance positions are unfavorable, a minimum play must generally be provided in the design. This minimum play can lead to unpleasant noise as well as bucking effects or slip-stick effects under significant system loads such as zero crossings, or when switching load direction especially after long periods of operation, and these become more intense especially as the time of operation increases due to the arising wear.

SUMMARY OF THE INVENTION

The object of the invention is to provide a fitting of the aforementioned type with which unpleasant noise and bucking effects can be avoided, even after a long time of operation.

According to the invention, a fitting is provided for an adjustment device, in particular for an inclination adjustment of a motor vehicle seat. The fitting comprises a fitting upper part having a first internal toothing, a fitting lower part which is adjustable relative to the fitting upper part about a fitting axis and has a second internal toothing arranged coaxially with respect to the first internal toothing, at least two, preferably three, rotatably arranged planet gears which are in engagement with the first and second internal toothings, and a drive shaft which is in operative connection with the at least two planet gears by means of a pinion. It is characteristic of the fitting according to the invention to use a spring element that prestresses the planet gears in the direction of their rotational axis either against the fitting lower part or the fitting upper part. The spring element is arranged within the fitting such that, depending on its arrangement, it exerts initial stress on the planet gears by means of which they press against the fitting part opposite the spring element.

By using a spring element, a reliable securing of the position of the planet gears in an axial direction is achieved, whereby the perceptible play is significantly reduced or avoided. At the same time, the initial stress ensures that the planet gears are adjusted in the case of wear from system loads such that the fitting possesses high reliability overall and, in addition, bucking or unpleasant noise does not occur despite wear even after long periods of operation i.e., use over several years. Any wear that occurs is compensated by the spring element since the spring element causes an adjustment from the initial spring stress to ensure nearly play-free operation even after wear.

In principle, the design and arrangement of the spring element is freely selectable. For example, a plurality of spring elements can be used that directly abut the individual planet gears. However, according to a particularly advantageous embodiment of the invention, the spring element is engaged with a bearing disk that radially bears the planet gears. According to this embodiment of the invention, a bearing disk serves to arrange the planet gears relative to each other. The use of a spring element provided according to this development that acts upon the bearing disk makes it possible to use an individual spring element to prestress all the planet gears which are used. Furthermore, this embodiment of the invention prevents relative movements of the planet gears in relation to the spring elements lying thereupon since the use of a bearing disk allows the stationary arrangement of the spring elements relative to the bearing disk.

In general, it is possible to provide a separate spring element that for example abuts the bearing disk in the installed position. However, according to one particularly advantageous embodiment of the invention, the spring element is formed on the bearing disk. According to this development of the invention constituting an integral design of the bearing disk and spring element, a separate spring element can be eliminated. In addition to radially accommodating the planet gears, the bearing disk according to this development of the invention satisfies the prestressing function through a corresponding design of the bearing disk.

In a particularly advantageous manner, there is not just one spring element formed on the bearing disk; rather, at least two and preferably three spring elements are formed distributed on the bearing disk. A corresponding design of the invention in which the spring elements are arranged equidistant from each other along a circular path extending around the fitting axis ensures particularly effective and even initial spring stress on the planet gears in the direction of the fitting upper part or fitting lower part. The spring elements are arranged symmetrically to the planet gears to particularly effectively prevent tipping or possibly causing uneven initial stress of the individual planet gears.

In addition, to minimize wear as well as reduce noise, the bearing disk can have a slide coating, at least in the area of contact with the planet gears, in another development of the invention.

In principle, the spring elements can be designed integrally with the bearing disk in any manner desired. One particularly advantageous embodiment of the invention however provides forming the spring elements as areas which are partially separated from the bearing disk by a recess, and which also have elevations projecting from a plane of the bearing disk. According to this embodiment of the invention, the spring elements are preferably formed by tabs which are separated from the bearing disk by recesses so that they are only elastically connected to the bearing disk by means of a bar. In order to achieve an elastic effect by the tabs when the bearing disk is in the installed position, the tabs have elevations which project from a plane of the bearing disk free of elevations, and this results in an elastic displacement of the tabs relative to the bearing disk when in the installed position which serves to realize the initial spring stress. This embodiment of the bearing disk is particularly easy and economical to create and is furthermore very reliable.

In principle, the fitting according to the invention can be used at any location on the motor vehicle seat. However, it is particularly advantageous to use the fitting to adjust the inclination of a motor vehicle seat, wherein it is generally arranged in the front region of the seat, and its height is adjustable relative to a seat frame. In order to use the fitting to adjust the inclination of a seat, a particularly advantageous development of the invention provides arranging fastening means on the fitting lower part, especially threaded bolts to fasten the fitting lower part to a seat frame, especially to an inside of a seat frame, and to arrange a tab on the fitting upper part for arranging a transfer tube.

According to this development of the invention, the fitting can be fastened directly to the seat structure. The fastening means serve to accomplish this which are arranged on the fitting lower part, especially threaded bolts, by means of which the fitting can be easily affixed to the seat frame, i.e., using suitable nuts. A transfer tube serves to transfer a swinging motion of the fitting upper part relative to the fitting lower part to the vehicle seat, the transfer tube being arranged at an appropriate location with the vehicle seat, and its two ends each being arranged on a fitting. The tab design enables a particularly easy and economical arrangement of a corresponding transfer tube on the fitting upper part. The fitting can be driven both by means of a hand wheel as well as a motorized drive which is suitably connected to the drive shaft.

According to a particularly advantageous embodiment of the invention, the fitting lower part has a projection which extends radially into a recess in the fitting upper part, since generally only a small path adjustment of the fitting upper part relative to the fitting lower part is required, especially when the fitting is used to adjust the seat inclination. By means of this embodiment of the invention, alternative means for limiting the movement of the fitting upper part relative to the fitting lower part can be eliminated, especially when used to adjust the inclination. The range of movement of the fitting upper part relative to the fitting lower part is determined by the range of movement within which the projection can move in the recess.

An exemplary embodiment of the invention is explained in the following in more detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
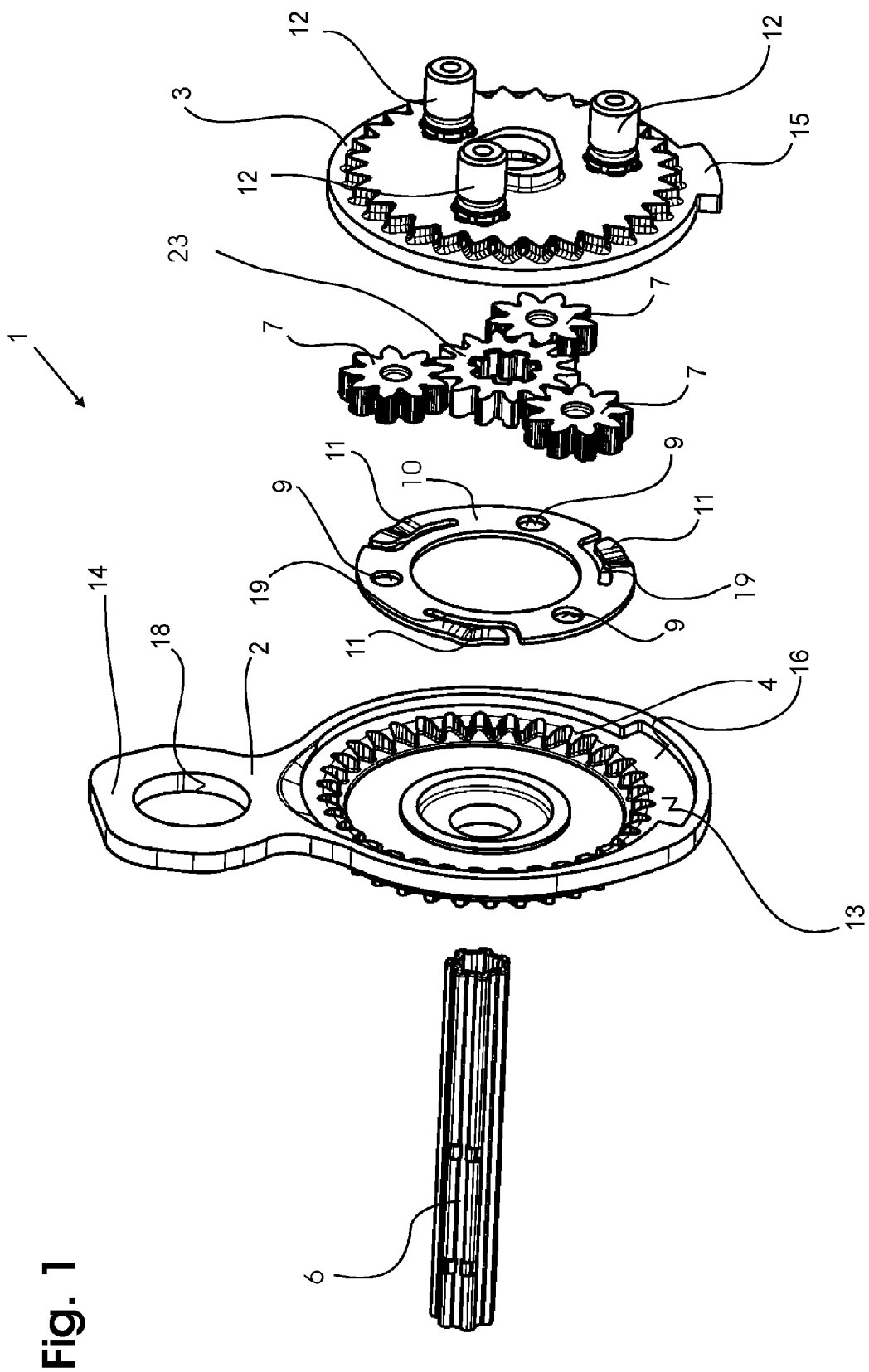
FIG. 1 is a first exploded view of a fitting with three planet wheels.
Figure 2:
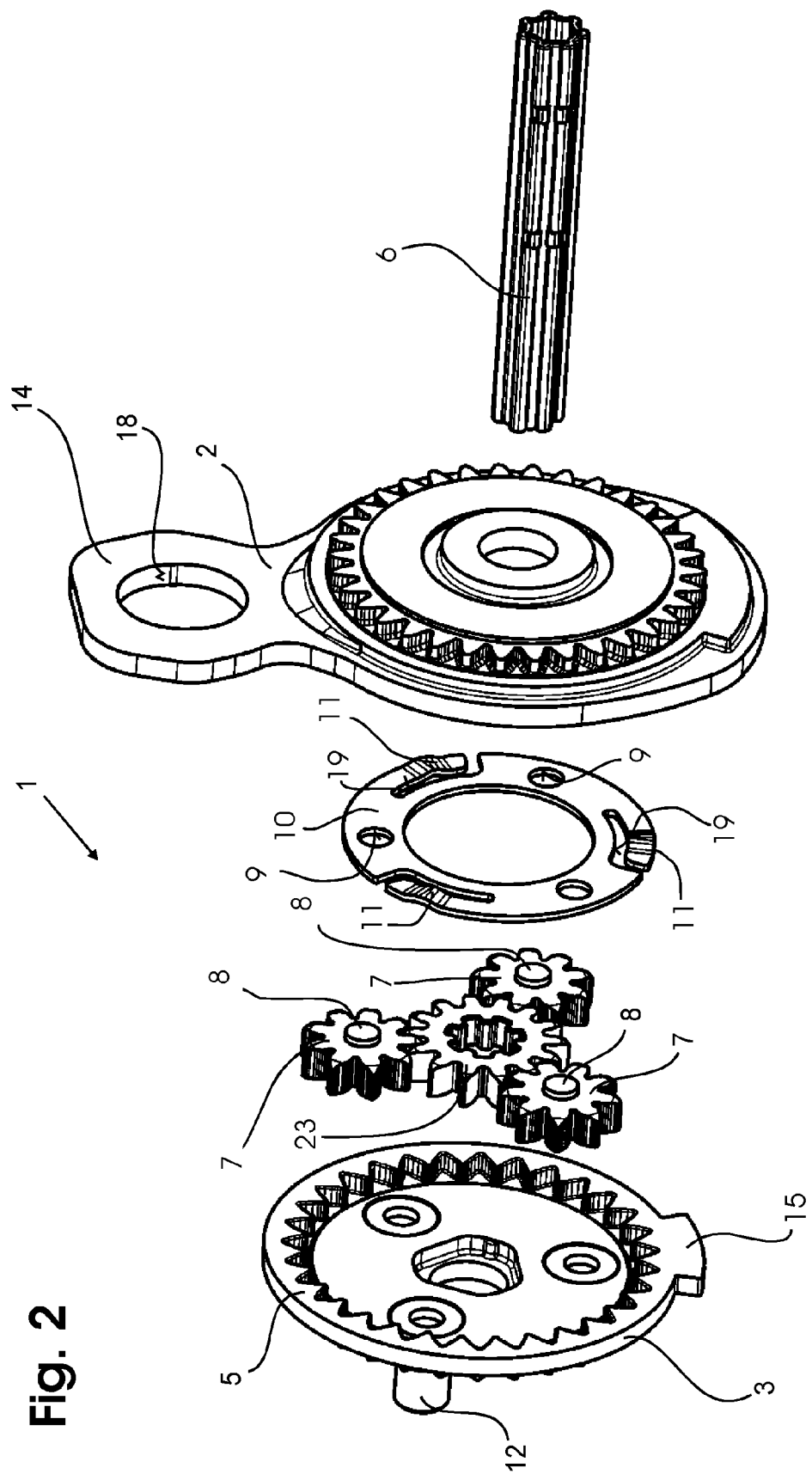
FIG. 2 is an additional exploded view of the fitting from FIG. 1.
Figure 3:
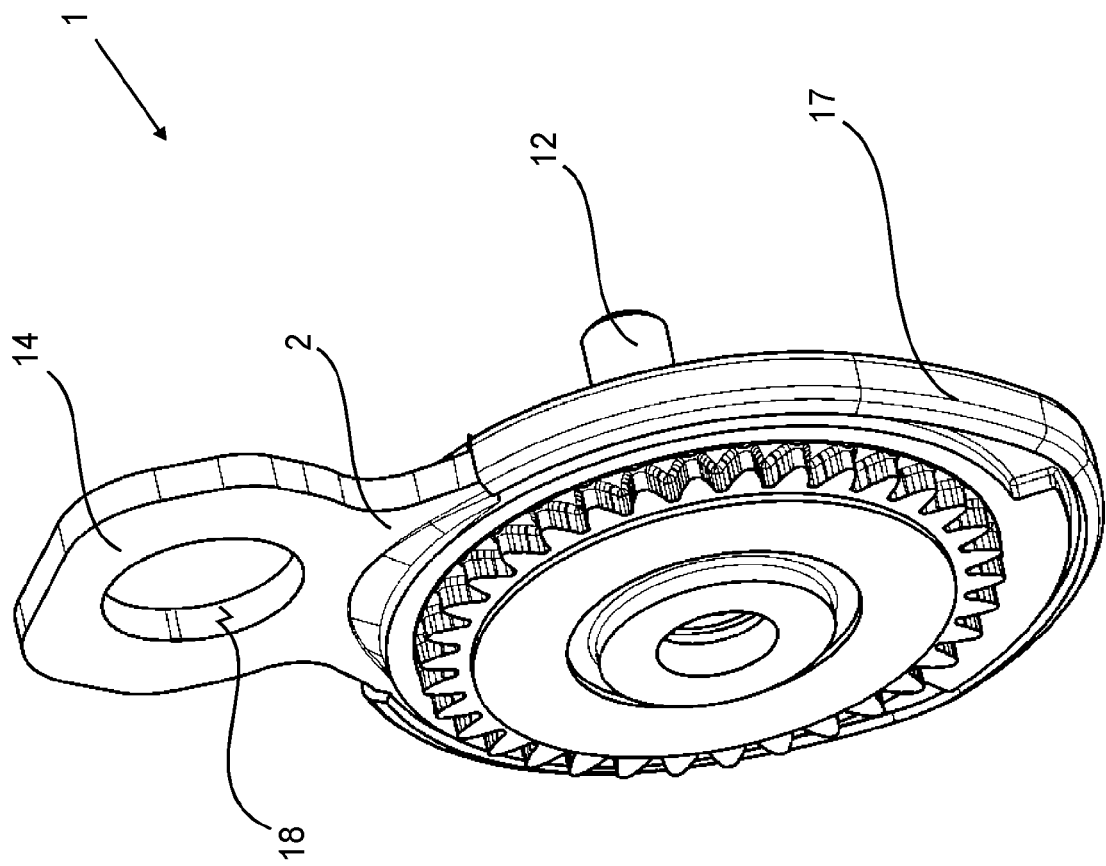
FIG. 3 is a perspective view of the fitting from FIG. 1.
Figure 4:
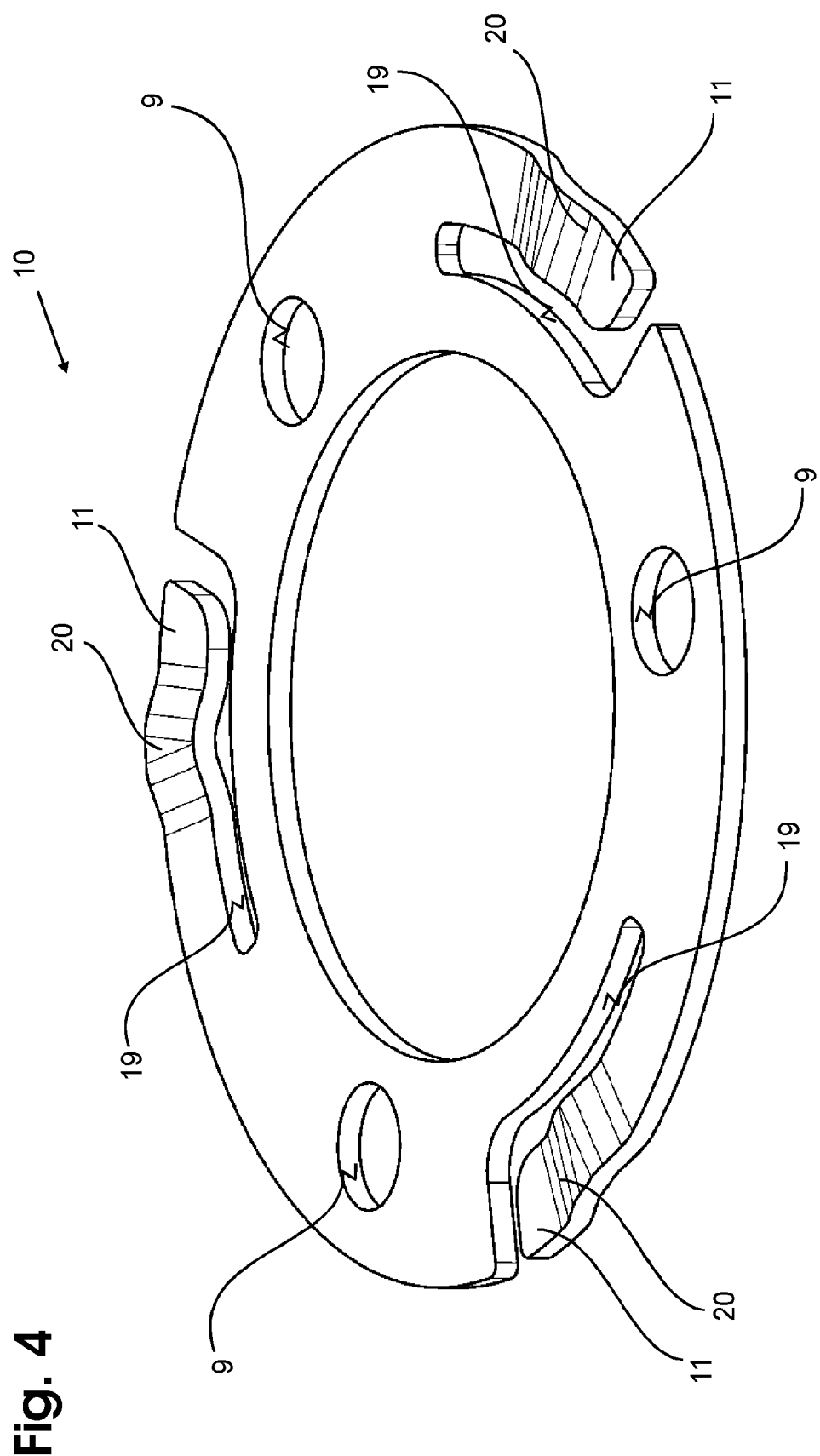
FIG. 4 is a perspective view of a bearing disk with spring elements designed as a single part.

Referring to the drawings in particular, the fitting 1 shown in FIG. 1 in an exploded view has a fitting upper part 2 with a first internal toothing 4 as well as a fitting lower part 3 with a second inner toothing 5. The inner toothings 4, 5 have a different number of teeth, wherein in the portrayed exemplary embodiment the number of teeth of the fitting upper part 2 is 34 teeth, and the number of teeth of the fitting lower part 3 is 31 teeth. The crown circles and root circles of the two inner toothings 4, 5 are concentric such that three planet gears 7 are engaged adjustably with both inner toothings 4, 5 in the assembled position.

The planet gears 7 are rotatably arranged with bearing hubs 8 in bearing openings 9 of a bearing disk 10, whereby the position of the planet gears 7 are rotatably fixed relative to each other. The bearing disk 10 that is preferably manufactured from a spring steel also has integral spring elements 11. The spring elements 11 are formed by tabs which are partially separated from the bearing disk 10 by recesses 19. The tabs thereby have elevations 20 which, when the fitting 1 is in the installed position, cause an elastic displacement of the tabs relative to the bearing disk 10. Since the bearing disk 10 contacts the planet gears 7 on one side and a contact surface 13 on the fitting upper part 2 on the other side, they are prestressed toward the fitting lower part 3.

A teethed drive shaft 6 serves to drive the fitting 1. This is engaged with a sun gear 23 which for its part is engaged with the planet gears 7. An adjustment of the fitting upper part 2 relative to the fitting lower part 3 is achieved by rotating the drive shaft 6 which rotates the planet gears 7 in the bearing openings 9 by means of the sun gear 23.

Figure 5:
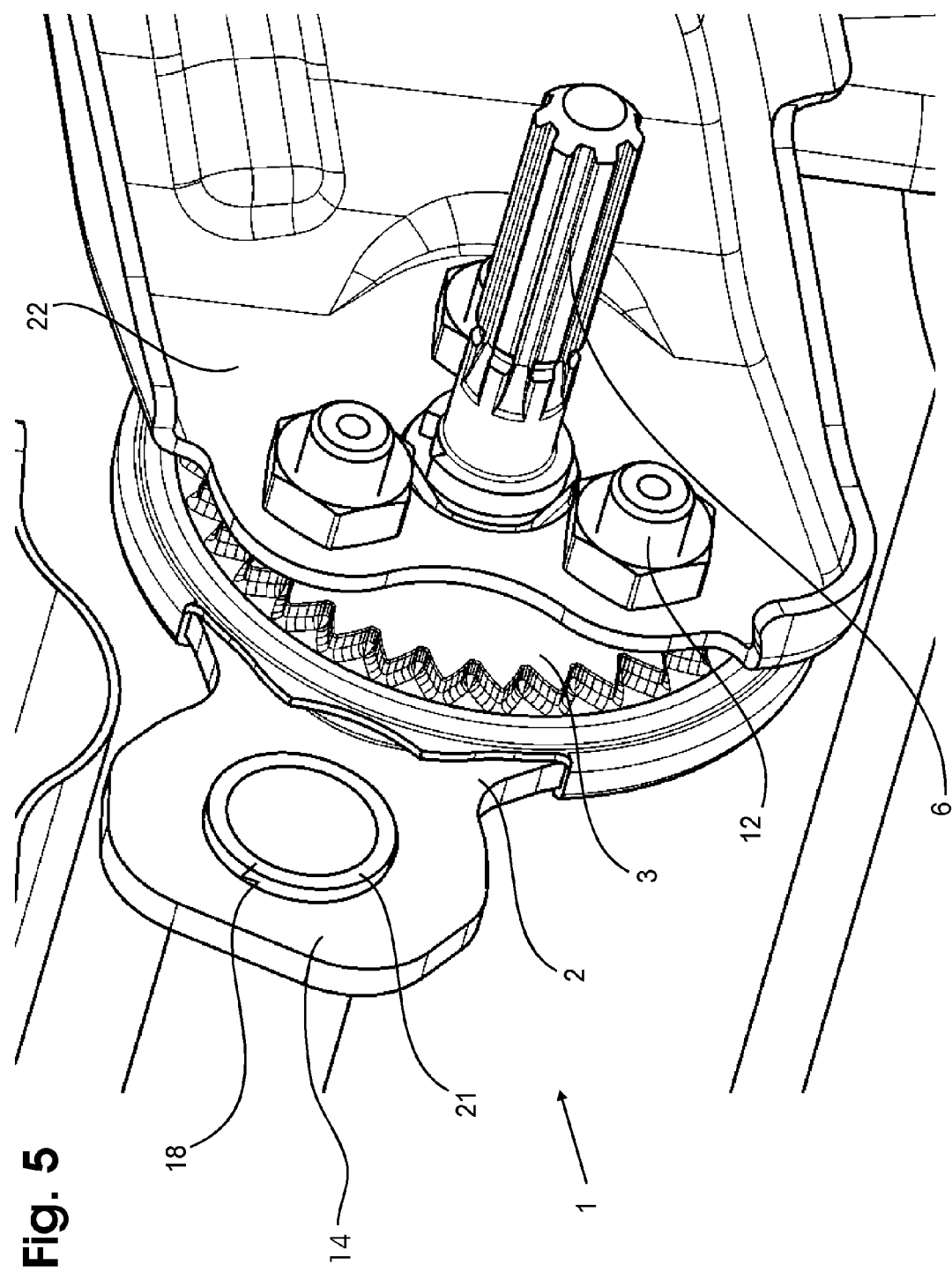
FIG. 5 is a perspective view of the fitting from FIG. 1 as a seat inclination adjuster.

In order to use the fitting 1 as an inclination adjuster, it is screwed to an inner side of the seat frame 22 by means of threaded bolts 12 arranged on the outside of the fitting lower part 3 as shown in FIG. 5. The fitting upper part 2 which is additionally arranged in its position on the fitting lower part 3 by means of a retaining ring 17 has a tab 14 which possesses an opening 18 to receive a transfer tube 21.

To adjust the fitting upper part 2 relative to the fitting lower part 3 arranged on the seat frame 22, the drive shaft 6 extends through an opening in the seat frame 22. Rotating the drive shaft 6 by means of a hand wheel (not shown in this case) which can be arranged on the drive shaft 6 causes the fitting upper part 2 to pivot relative to the fitting lower part 3. The pivoting angle is limited by a projection 15 on the fitting lower part 3 that is arranged in a recess 16 in the fitting upper part 2.

While specific embodiments of the invention have been shown and described in detail to illustrate the application of the principles of the invention, it will be understood that the invention may be embodied otherwise without departing from such principles.

The invention claimed is:

1. A motor vehicle seat fitting comprising:
a first fitting part having first part internal toothing;
a second fitting part having second part internal toothing, the second fitting part being adjustable in position relative to the first fitting part about a fitting axis, said second part internal toothing being arranged coaxially with respect to said first part internal toothing;
a plurality of rotatably arranged planet gears, each of said planet gears being in engagement with said first part internal toothing and said second part internal toothing;
a pinion gear;
a drive shaft operatively connected said plurality of planet gears via said pinion gear;
a spring element;
at least one additional spring element to provide a plurality of spring elements; and
a bearing disk, wherein the spring elements are engaged with the bearing disk that radially bears toward the planet gears, wherein said spring elements are formed distributed on said bearing disk, said spring elements biasing the planet gears in an axial direction, toward one of said first fitting part and said second fitting part, wherein the spring elements are formed by regions that are partially separate from a remainder of said bearing disk by a recess, and said regions have elevations projecting from a plane of said bearing disk, wherein each of said spring elements is defined by an outermost portion of said bearing disk, said outermost portion defining a periphery of said bearing disk.

2. The fitting according to claim 1, further comprising threaded bolts arranged on said second fitting part to fasten said second fitting part to a seat frame, and a tab for arranging a transfer tube on the first fitting part.

3. The fitting according to claim 1, wherein said second fitting part has a projection which extends radially into a recess in said first fitting part.

4. The fitting according to claim 1, wherein each of said planet gears has a projection, said bearing disk having a plurality of recesses, each of said recesses receiving at least a portion of said projection of one of said planet gears.

5. The fitting according to claim 4, wherein each of said recesses is located between said spring element and said at least one additional spring element in a circumferential direction of said bearing disk.

6. A fitting for an adjustment device for an inclination adjustment of a motor vehicle seat, the fitting comprising:
a fitting upper part having a first internal toothing;
a fitting lower part which is adjustable relative to the fitting upper part about a fitting axis and has a second internal toothing arranged coaxially with respect to the first internal toothing;
at least two rotatably arranged planet gears which are in engagement with the first and second internal toothings;
a drive shaft which is in operative connection with the at least two planet gears by means of a pinion; and
a bearing disk comprising a plurality of spring elements, said spring elements prestressing the planet gears in an axial direction of rotation toward the fitting lower part or fitting upper part, each of said spring elements being defined by an outer circumferential portion of said bearing disk, wherein each of said spring elements defines an outer periphery of said bearing disk, each of said spring elements being located at a spaced location from an inner circumferential portion of said bearing disk with respect to a radial direction of said bearing disk, wherein at least said spring elements and said inner circumferential portion define a plurality of spaces, at least a portion of each of said spaces extending in the circumferential direction of said bearing disk, each of said spring elements having at least one elevation projecting from a plane of the bearing disk.

7. The fitting according to claim 6, wherein each of said planet gears has a projection, said bearing disk having a plurality of recesses, each of said recesses receiving at least a portion of said projection of one of said planet gears.

8. The fitting according to claim 7, wherein each of said recesses is located between said one of said spring elements and another one of said spring elements in said circumferential direction of said bearing disk.

* * * * *